US012010533B2

(12) United States Patent
Simms et al.

(10) Patent No.: US 12,010,533 B2
(45) Date of Patent: Jun. 11, 2024

(54) RADIO DEVICE ANOMALY DETECTION

(71) Applicant: MOTOROLA SOLUTIONS, INC., Chicago, IL (US)

(72) Inventors: Matthew E. Simms, Davie, FL (US); Chirayu M. Patel, Lawrenceville, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 372 days.

(21) Appl. No.: 17/566,774

(22) Filed: Dec. 31, 2021

(65) Prior Publication Data

US 2023/0217272 A1 Jul. 6, 2023

(51) Int. Cl.
*H04W 24/04* (2009.01)
*H04L 41/0654* (2022.01)
(Continued)

(52) U.S. Cl.
CPC ......... *H04W 24/04* (2013.01); *H04L 41/0654* (2013.01); *H04L 43/0817* (2013.01); *H04W 8/005* (2013.01)

(58) Field of Classification Search
CPC ... H04L 41/16; H04L 41/142; H04L 63/1425; H04L 43/16; H04L 41/0631;
(Continued)

(56) References Cited

U.S. PATENT DOCUMENTS 10,404,777 B2  9/2019  Saini et al.
10,778,566 B2  9/2020  Mermoud et al.
(Continued)

FOREIGN PATENT DOCUMENTS

EP   2943001 A1    11/2015
GB   2577758 A  *  4/2020   .......... H04L 41/142
GB   2577758 A     4/2020

OTHER PUBLICATIONS

3GPP, "3rd Generation Partnership Project; Technical Specification Group Services and System Aspects; Architecture enhancements for 5G System (5GS) to support network data analytics services (Release 16)" Dec. 23, 2021 <https://ftp.3gpp.org/3guInternal/3GPP_ultimate_versions_to_be_transposed/sentToDpc/23288-ga0.zip23288-ga0.docx> (67 pages).
(Continued)

*Primary Examiner* — Golam Sorowar
(74) *Attorney, Agent, or Firm* — Michael Best & Friedrich LLP (57) ABSTRACT

Systems and methods of identifying anomalies within radio devices. The method includes obtaining raw radio data from a radio device of a plurality of radio devices, identifying a radio performance indicator related to an operational performance, determining a long-term and a short-term average of the indicator based on previously received indicators from the device, and determining a weighted ratio of the long-term and short-term average based on an age of the indicator and an amount of the previously received indicators. The method includes generating a curated indicator from the weighted ratio and the indicator, deriving, from a plurality of curated indicators from the plurality of devices and the curated indicator, a curated group average, determining an anomaly in the operational performance of the radio device based on a comparison of the curated indicator and the curated group average, determining a recommended action, and transmitting an electronic notification indicating the action.

20 Claims, 5 Drawing Sheets

(51) Int. Cl.
*H04L 43/0817* (2022.01)
*H04W 8/00* (2009.01)

(58) Field of Classification Search
CPC ... H04L 41/145; H04L 41/5009; H04L 43/08; H04L 63/1416; H04L 41/064; H04L 41/147; H04L 43/06; H04L 43/0823; H04L 41/0654; H04L 43/10; H04L 41/22; H04L 63/20; H04L 41/0636; H04L 41/12; H04L 41/40; H04L 43/028; H04L 43/067; H04L 63/145; H04L 63/1408; H04L 12/4641; H04L 41/0618; H04L 41/0622; H04L 41/069; H04L 67/303; H04W 24/04; H04W 24/08; H04W 48/18; H04W 24/10; H04W 24/02; H04W 4/38; H04W 88/06; H04W 12/12; H04W 12/128; H04W 4/029; H04W 24/00; H04W 4/70; H04W 4/80; H04W 28/0236; H04W 40/02; H04W 72/23; H04W 24/06; H04W 36/30; H04W 36/32; H04W 4/02; H04W 4/021; H04W 4/20; H04W 4/90; H04W 48/16; H04W 52/24; H04W 64/00; H04W 68/02; H04W 76/28; H04W 76/50; H04W 84/042

See application file for complete search history.

(56) References Cited

U.S. PATENT DOCUMENTS

| | | |
|---|---|---|
| 2019/0319868 A1 | 10/2019 | Svennebring et al. |
| 2021/0274351 A1 | 9/2021 | Vitebsky |
| 2021/0319894 A1* | 10/2021 | Sobol .................. G06N 7/01 |
| 2021/0321278 A1* | 10/2021 | Zeng ..................... H04L 1/0026 |
| 2021/0351973 A1* | 11/2021 | Ford ..................... H04L 43/067 |
| 2021/0385238 A1* | 12/2021 | Akella ................ H04L 63/1416 |

OTHER PUBLICATIONS

International Search Report and Written Opinion for Related Application No. PCT/US2022/081207 dated Mar. 9, 2023 (19 pages).

* cited by examiner

RADIO DEVICE ANOMALY DETECTION

BACKGROUND OF THE INVENTION

Enterprises may provide employees, clients, and/or customers wireless electronic communication devices to facilitate communications between users. Use of electronic communication devices by first responders and public safety agencies (for example, fire, police, and emergency medical agencies) is well established. Wireless communication systems, for example, trunked land mobile radio (LMR) systems, may include hundreds or even thousands of devices operating in multiple talkgroups across large geographic areas.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments and aspects of concepts that include the claimed subject matter, and explain various principles and advantages of those embodiments and aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments and aspects.

The apparatus and method components have been represented where appropriate by conventional symbols in the drawings, showing only those specific details that are pertinent to understanding the embodiments and aspects of the invention so as not to obscure the disclosure with details that will be readily apparent to those of ordinary skill in the art having the benefit of the description herein.

DETAILED DESCRIPTION

As noted above, enterprises provide users a plurality of electronic communication devices to facilitate services (for example, public safety services). A device management server may be utilized to facilitate the implementation, operation, and maintenance of such devices. For certain enterprises (for example, public safety agencies), the maintenance of such devices may be crucial to sustain the services provided by the enterprise. However, in cases where the number of the plurality of electronic communication devices extends beyond a particular number, it may be difficult to identify an anomaly (for example, a malfunction or operation that deviates from a desired standard) in the operational performance of a respective device. It may also be difficult to characterize or determine a particular factor that causes the anomaly. For example, the manner in which a user handles or operates a device may contribute to the occurrence of anomaly and it can be difficult to distinguish between an anomaly caused by user behavior versus an anomaly caused by an equipment, hardware, or software failure. In addition, environmental factors (for example, weather conditions, interference caused by a buildings and other geographic features) or a network infrastructure capabilities and failures may also contribute to degraded performance. These contributing factors can be difficult to identify.

Accordingly, embodiments herein provide, among other things, systems and methods for analytically detecting anomalies within a group of devices.

One example provides a data analytics platform system of identifying anomalies within radio devices. The system includes a transceiver and an electronic processor. The electronic processor is configured to obtain, via the transceiver, raw radio data from a radio device of a plurality of radio devices assigned to a group within a predefined geographic area, identify, from the raw radio data, a radio performance indicator related to an operational performance of the radio device, the radio performance indicator being associated with a radio communication frequency of the group, and determine a long-term average and a short-term average of the radio performance indicator based on previously received radio performance indicators from the radio device. The processor is further configured to determine a weighted ratio of the long-term average and the short-term average based on an age of the radio performance indicator and an amount of the previously received radio performance indicators from the radio device, generate a curated radio performance indicator from the weighted ratio and the radio performance indicator, and derive, from a plurality of curated radio performance indicators from the plurality of radio devices and the curated radio performance indicator, a curated group average of the radio performance indicator of the group. The processor is further configured to determine an anomaly in the operational performance of the radio device based on a comparison of the curated radio performance indicator and the curated group average of the radio performance indicator, determine a recommended action to address the anomaly, and transmit an electronic notification indicating the recommended action.

Another example provides a method of identifying anomalies within radio devices. The method includes, at a data analytics platform and via an electronic processor of the data analytics platform, obtaining raw radio data from a radio device of a plurality of radio devices assigned to a group within a predefined geographic area, identifying, from the raw radio data, a radio performance indicator related to an operational performance of the radio device, the radio performance indicator being associated with a radio communication frequency of the group, and determining a long-term average and a short-term average of the radio performance indicator based on previously received radio performance indicators from the radio device. The method further includes determining a weighted ratio of the long-term average and the short-term average based on an age of the radio performance indicator and an amount of the previously received radio performance indicators from the radio device, generating a curated radio performance indicator from the weighted ratio and the radio performance indicator, deriving, from a plurality of curated radio performance indicators from the plurality of radio devices and the curated radio performance indicator, a curated group average of the radio performance indicator of the group, and determining an anomaly in the operational performance of the radio device based on a comparison of the curated radio performance indicator and the curated group average of the radio performance indicator. The method also includes determining a recommended action to address the anomaly and transmitting an electronic notification indicating the recommended action.

For ease of description, some or all of the example systems presented herein are illustrated with a single example of each of its component parts. Some examples may not describe or illustrate all components of the systems. Other example embodiments may include more or fewer of each of the illustrated components, may combine some components, or may include additional or alternative components. It should be understood that while the systems and methods are described herein in terms of electronic radio devices, that the systems and methods may also be applied to other devices (for example, computers, cellphones, smart batteries, and others).

Figure 1:
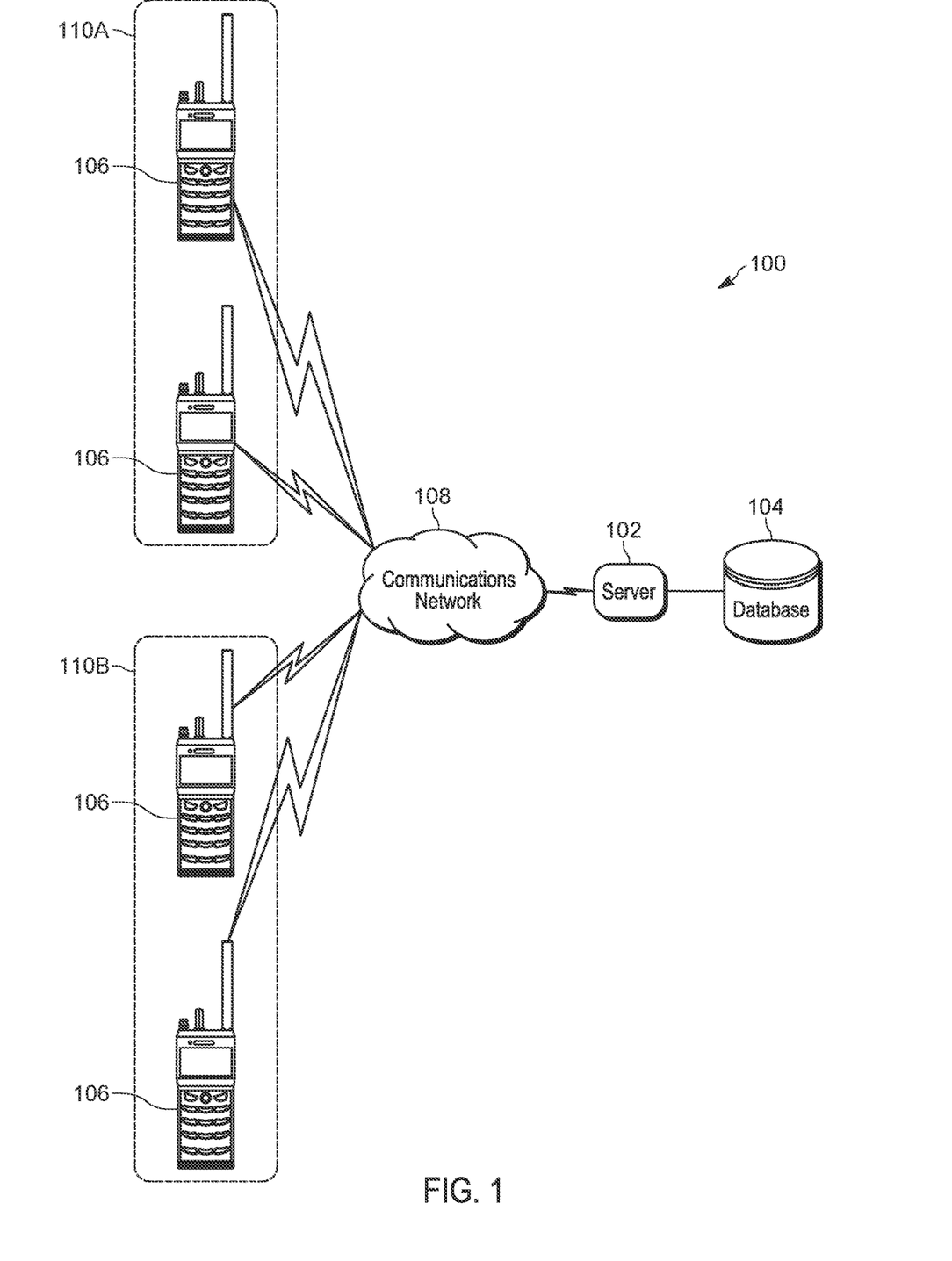
FIG. 1 is a diagram of a communication system, in accordance with some aspects.
Figure 2:
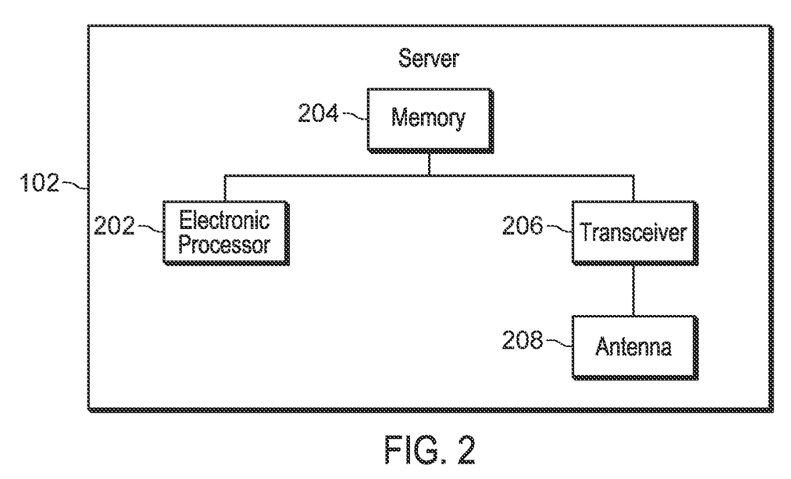
FIG. 2 is a diagram of a server included in the communication system of FIG. 1, in accordance with some aspects.

FIG. 1 illustrates an example data analytics system 100. The system 100 includes a server 102, a database 104, and a plurality of electronic communication devices 106. The server 102, described more particularly below with respect to FIG. 2, is communicatively coupled to, and writes data to and from, the database 104. As illustrated in FIG. 1, the database 104 may be a database housed on a suitable database server communicatively coupled to and accessible by the server 102. In alternative embodiments, the database 104 may be part of a cloud-based database system (for example, a data warehouse) external to the system 100 and accessible by the server 102 over one or more wired or wireless networks. In some embodiments, all or part of the database 104 may be locally stored on the server 102. The server 102, as explained in more detail below, is configured to receive (for example, by sending a request to respective devices 106, receiving a push of information from respective devices, and/or intercepting a radio transmission from the respective devices 106) raw radio data from the devices 106. Raw data from the devices 106 may include data regarding operation of the device that is available at an operating system level. For example, raw data may include various data regarding software applications running on the device 106. Raw data may also include sensed data obtained from sensors (which are described below). As is explained in more detail, the server 102 also analyzes the raw radio data for one or more radio performance indicators related to an operational performance of the respective device 106. The server 102 may electronically store the collected data regarding the devices 106, for example, in the database 104. In some embodiments, the database 104 also stores device management information. Device management information includes, for example, talkgroup assignments for the devices 106, device model information, device configuration information, and user information. In some aspects, the server 102 is a device management server configured to track and manage information regarding the devices 106. As described in more detail below, the database 104 also stores a plurality of radio performance indicators of each of the plurality of radio devices 106.

The devices 106 are communicate with one another via the communications network 108. The communications network 108 may include, for example, a land mobile radio (LMR) network, a terrestrial trunked radio (TETRA) network, a digital mobile radio (DMR) network, or an LTE network or combinations of networks. The communications network 108 or parts of it may support or operate in accordance with various protocols, for example, transport control protocol/internet protocol (TCP/IP), Global System for Mobile Communications (or Groupe Special Mobile (GSM)), General Packet Radio Service (GPRS), Code Division Multiple Access (CDMA), Evolution-Data Optimized (EV-DO), Enhanced Data Rates for GSM Evolution (EDGE) network, 3G, 4G, 5G, a device-to-device protocol, and combinations or derivatives thereof.

In one example, each of the plurality of devices 106 is associated with a respective group 110A, 110B. In one example, each group 110A, 110B is associated with a particular geographic area (for example, an area of approximately 400 square feet). The geographic area may be, for example, a network-defined grid or a geofenced area and may be defined based on a radio frequency region/coverage of the group 110A, 110B. In some instances, each group 110A, 110B is associated with a common company/enterprise (for example, a public safety agency).

FIG. 2 schematically illustrates the server 102 in more detail. In the example provided, the server 102 includes an electronic processor 202, a memory 204, a network interface 206 for communicating over the communications network 108 and, optionally, one or more other networks or connections. The electronic processor 202, the memory 204, and network interface 206 communicate over one or more communication lines or buses, wirelessly, or a combination thereof.

The electronic processor 202 may include a microprocessor, application-specific integrated circuit (ASIC), or another suitable electronic device. The electronic processor 202 obtains and provides information (for example, from the memory 204 and/or the network interface 206) and processes the information by via hardware logic and/or by executing one or more software instructions or modules, capable of being stored, for example, in a random access memory ("RAM") area of the memory 204 or a read only memory ("ROM") of the memory 204 or another non-transitory computer readable medium (not shown). The software can include firmware, one or more applications, program data, filters, rules, one or more program modules, and other executable instructions. The electronic processor 202 is configured to retrieve from the memory 204 and execute, among other things, software related to the control processes and methods described herein.

The memory 204 can include one or more non-transitory computer-readable media and includes a program storage area and a data storage area. The program storage area and the data storage area can include combinations of different types of memory, including those mentioned above. In the example illustrated, the memory 204 stores, among other things, radio performance indicators (described in detail below). In some embodiments, some or all of the memory 204 is integrated into the database 104.

The electronic processor 202 is configured to control the network interface 206 to transmit and receive signals (for example, messages) to and from, for example, the communications network 108 and/or the devices 106. The electronic processor 202 and the network interface 206 may include various digital and analog components, which for brevity are not described herein and which may be implemented in hardware, software, or a combination of both. Some embodiments include transmitting and receiving components for wireless communications.

Figure 3:
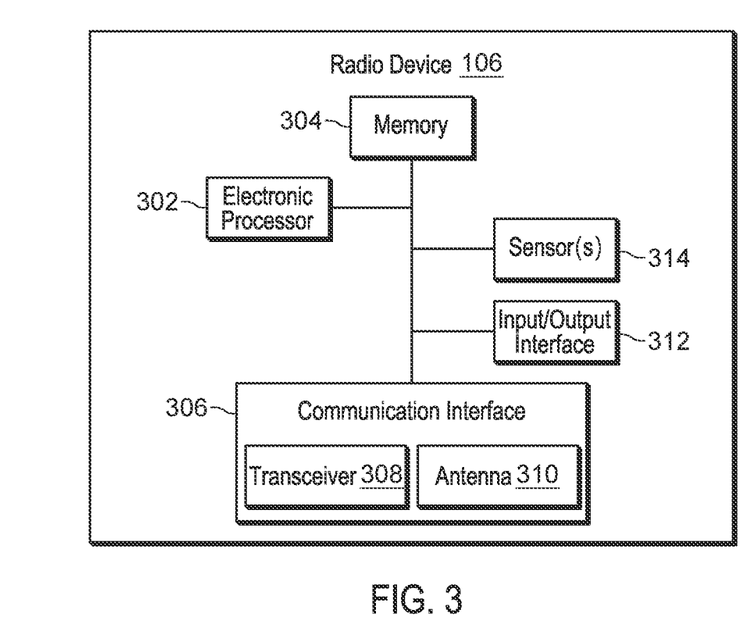
FIG. 3 is a diagram of an electronic radio device of the system of FIG. 1, in accordance with some aspects.

FIG. 3 illustrates an example of a device 106. In the example illustrated, the device 106 includes an electronic processor 302, a memory 304, and a communication interface 306. The communication interface 306 includes a transceiver 308 an antenna 310, and input/output interface 312. The illustrated components, along with other various modules and components are connected to each other by or through one or more control or data buses that enable communication therebetween. The use of control and data buses for the interconnection between and exchange of information among the various modules and components would be apparent to a person skilled in the art in view of the description provided herein.

The electronic processor 302 obtains and provides information (for example, from the memory 304 and/or the communication interface 306) and processes the information, for example, via hardware logic, and/or by executing one or more software instructions or modules, capable of being stored, for example, in a random access memory ("RAM") area of the memory 304 or a read only memory ("ROM") of the memory 304 or another non-transitory computer readable medium (not shown). The software can include firmware, one or more applications, program data, filters, rules, one or more program modules, and other executable instructions. The electronic processor 302 is configured to retrieve from the memory 304 and execute, among other things, software related to the control processes and methods described herein with respect to the devices 106. For example, the electronic processor 302 is configured to decode data from radio frequency transmissions that contain concurrent voice and data signals (for example, received via the transceiver 308 and the antenna 310). The memory 304 can include one or more non-transitory computer-readable media and includes a program storage area and a data storage area. The program storage area and the data storage area can include combinations of different types of memory, as described herein.

The communication interface 306 is configured to receive input and to provide system output. The communication interface 306 includes hardware (for example, the transceiver 308 and the antenna 310) for communicating over one or more wired or wireless communication networks or connections with, for example, the devices 106 and the server 102.

The electronic processor 302 is configured to control the transceiver 308 to transmit and receive digital radios signals to and from, for example, the communications network 108 and/or the devices 106 using the antenna 310. The electronic processor 302 and the transceiver 308 may include various digital and analog components, which for brevity are not described herein and which may be implemented in hardware, software, or a combination of both. Some examples include separate transmitting and receiving components, for example, a transmitter and a receiver, instead of a combined transceiver 308.

The input/output interface 312 may include one or more input mechanisms (for example, a touch screen, a microphone, a keypad, buttons, knobs, and the like), one or more output mechanisms (for example, a display, a speaker, and the like), or a combination thereof. The input/output interface 312, for example, receives input from input a user (for example, via a selection of a graphical component of a GUI displayed on a touch screen) and provides output to a user (for example, text or graphics displayed on a touch screen).

The radio device 106 may include one or more sensors 314. Each of the one or more sensors 314 may be an electronic or electromechanical device which detects changes in a phenomenon (for example, temperature, acceleration, pressure, magnetic flux, light intensity, received audio level, resistance, capacitance, voltage, current, and the like). In some instances, the sensors may sense a phenomenon that is or is indicative of a radio performance indicator of the device 106. For example, the one or more sensors 314 are configured to capture and provide, to the electronic processor 302, one or more characteristics of an environment internal and/or external to the device 106 to the electronic processor 302. In some embodiments, the one or more sensors 314 include an electronic or electromechanical device (for example, a switch), which detects an electrical or mechanical state. For example, a sensor of the one or more sensors 314 sense when an electrical connection is made or broken. The one or more sensors 314 may all be of the same type or may include different combinations of the types of sensors described, as well as other sensor types not listed.

Figure 4:
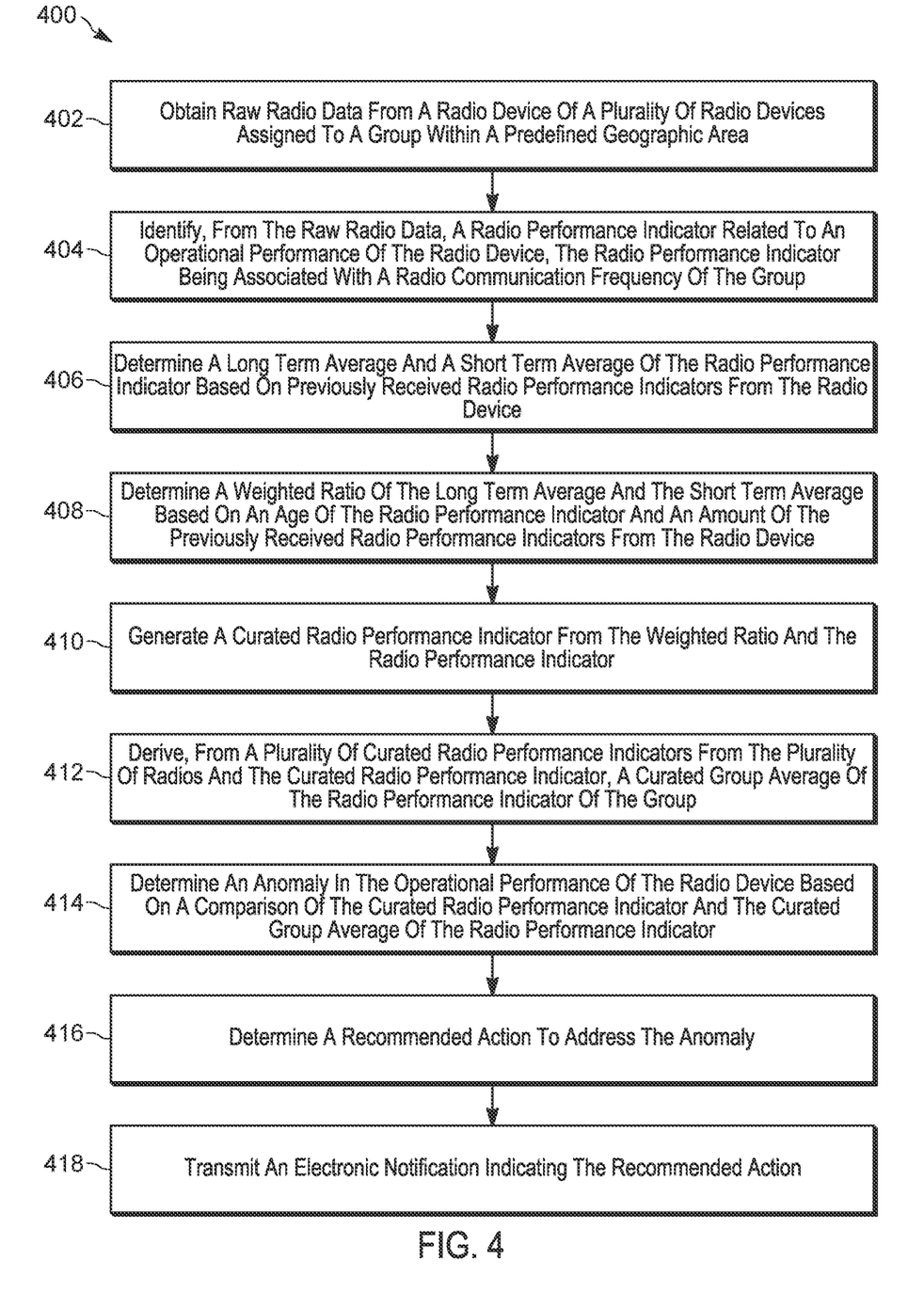
FIG. 4 is a flowchart of a method for determining anomalies within a group of devices of the system of FIG. 1, in accordance with some aspects.

FIG. 4 illustrates an example method 400 for identifying anomalies within a group of radio devices. The method 400 is described as being performed by the server 102 and, in particular, the electronic processor 202. However, it should be understood that in some embodiments, portions of the method 400 may be performed by/across one or more other devices. While FIG. 1 illustrates a particular number of devices 106 and groups 110, it should be understood that embodiments of the method 400 may be used to collect data from a different number of devices and/or groups than illustrated.

As illustrated in FIG. 4, at block 402, the electronic processor 202 obtains (for example, as described above) raw radio data from a radio device 106 of a plurality of radio devices 106 assigned to a group 110A, 110B within/associated with a predefined geographical area (for example, a predefined geofence).

At block 404, the processor 202 identifies, from the raw radio data, a radio performance indicator related to an operational performance of the radio device 106. In one instance, the radio performance indicator is a measurement or value of a condition of a feature or characteristic of the radio device 106. In instances in which radio devices are of interest, relevant radio performance indicator may include (or be selected from the group consisting of) a bit error rate, a signal strength, call information, a call type, a location, a battery level, a battery characteristic, a mode of operation, a call error, a site status, a signal-to-noise ratio, an antenna characteristic, a temperature, an authentication failure, and an indication of physical or user handling of the radio device (for example, based on signals from an accelerometer or microphone). The radio performance indicator may be or be related to a signal metric, for example, one or more of a received signal strength indicator (RSSI), bit error rate (BER), a signal-to-noise ratio (SNR), a radio site identification, a call type, when and/or how long the radio device 106 was not connected to one or more communication networks (for example, network 108), and the like. The radio performance indicator may be related to an error code or a count thereof relating to, for example, a push-to-talk function of the radio device 106, a component of the radio device 106 (for example, the transceiver), and/or a number of attempts to receive/transmit a signal. The radio performance indicator may also relate to an operation of a component of the radio device 106. The radio performance indicator may be a number of times the radio was muted for a predetermined time, a battery level, or a count of how many times the battery reached a particular level (for example, 20% or 0%), a time to fully charge the battery, a battery characteristic, and the like. The radio performance indicator may be or be related to a user operation of/interaction with the radio device 106. The radio performance indicator may be, for example, a talk volume of a user received by a microphone. The radio performance indicator is associated with a radio communication frequency of or utilized by the groups 110A, 110B (for example, the communication frequency for the device 106 within the group). In some embodiments, the radio performance indicator may include multiple measurements relating to a particular characteristic of the radio device 106.

At block 406, the electronic processor 202 determines (for example, computes) a long-term average and a short-term average of the radio performance indicator based on previously received radio performance indicators from the radio device. At block 408, the electronic processor determines (for example, computes) a (combined) weighted ratio of the long-term average and the short-term average. The electronic processor 202 then generates a curated (weighted/adjusted) radio performance indicator based on an age of the radio performance indicator and an amount of previously received radio performance indicators from the radio device 106 (block 410). In particular, the respective weighting of the long-term average and the short-term average within the weighted ratio is based on an age of the obtained radio performance indicator and an amount of the previously received radio performance indicators from the radio device. In some instances, the weighted ratio is determined based on a type of the radio performance indicator. In some instances, the weighted ratio is determined based on a previously determined anomaly associated with the radio device 106.

The short-term average includes one or more filter coefficients that are adjusted based on one or more characteristics of the radio performance indicator and/or the radio device 106 (for example, an age of the radio device 106 and/or the radio performance indicator, an amount of previously received radio performance indicators, and the like). The coefficients assign a contribution/weight of one or more attributes of the short-term average in the weighted ratio against the long-term average. In some examples, the coefficient(s) may be considered as (a) smoothing factor(s). It should be understood that in some examples, the previously received radio performance indicators are of a same type or at least related to the obtained radio performance indicator. In other instances, however, the amount of previously received radio performance indicators may be an overall amount and/or variety of radio performance indicators. When the amount of previously received radio performance indicators is below a predetermined threshold, the short-term average is weighed more heavily than the long-term average. For example, when the device 106 has previously contributed no or few (for example, below a minimum threshold) radio performance indicators, the latest received radio performance indicators are attributed more weight than the older received radio performance indicators. As more radio performance indicators are contributed by/obtained from the device 106, the weight of the short-term average increases as compared to the long-term average of the contributed radio performance indicators in the determination of the weighted ratio of the radio performance indicator. In one aspect, the combination of the short-term and the long-term average facilitates identification of slow and fast trends across a plurality of devices 106 of the group 110A, 110B. The electronic processor 202 applies the determined weighted ratio to the radio performance indicator to produce a respective curated radio performance indicator.

At block 412, the electronic processor 202 determines, from a plurality of curated radio performance indicators from the plurality of radio devices 106 and the curated radio performance indicator, a curated group average of the radio performance indicator of the (common) group 110A, 110B. The plurality of curated radio performance indicators are each derived from a respective radio device 106 of a group 110A, 110B in which the single radio device 106 described in reference to blocks 402, 404, 406, 408, and 410 is also assigned to. In other words, the curated group average is a derivation of a common weighted average of the respective curated radio performance indicator of each individual radio device 106 across the plurality of radio devices 106 assigned to a common group 110A, 110B. For each curated radio performance indicator of the plurality of curated radio performance indicators, the respective weighted ratio applied to each respective radio performance indicator to produce the curated radio performance indicator is determined on an individual radio device 106 basis at least similar to the method described in blocks 402, 404, 406, 408, and 410 above.

In some examples, the electronic processor 202, in deriving the curated group average, assigns a first weight to a first curated radio performance indicator of a first radio device 106 of the plurality of radio devices 106 of the first radio device 106 based on an age of the first curated radio performance indicator and assigns a second weight less than the first weight to a second curated radio performance indicator of a second radio device 106 of the plurality of radio devices 106 of the second radio device based on an age of the second curated radio performance indicator, the age of the second curated radio performance indicator being greater than the age of the first curated radio performance indicator. In other words, older curated performance indicators (indicators that, according to the individual weighted ratio of the respective device 106, weighted long-term data more than short-term data above a predetermined threshold) may be weighed less than newer curated performance indicators (indicators that, according to the individual weighted ratio, weighted short-term data more than long-term data above a predetermined threshold). Such weighting in the derivation of the curated group average may be determined based on or more predetermined age thresholds (for example, curated indicators including more information from the past week may be weighted more than indicators including information from more than a week ago).

In some instances, the electronic processor 202, in deriving the curated group average, assigns a first weight to a first curated radio performance indicator of the plurality of curated radio performance indicators of a first radio device of the plurality of radio devices based on a first amount of curated radio performance indicators of the first radio device and assigns a second weight greater than the first weight to a second curated radio performance indicator of the plurality of curated radio performance indicators of a second radio device of the plurality of radio devices based on a second amount of curated radio performance indicators of the second radio device. In other words, curated performance indicators from devices 106 that have contributed a certain amount of curated performance indicators in the past may be weighed more than curated performance indicators from devices 106 that have contributed less data. Such weighting in the derivation of the curated group average may be determined based on or more predetermined amount thresholds.

At block 414, an anomaly in the operational performance of the radio device 106 is determined based on a comparison of the curated group indicator and the curated group average of the radio performance indicator. It should be understood that while the term "anomaly" used herein refers to errors resulting from hardware and/or software performances of a single radio device 106 alone, the term also is used generally herein in reference to a curated radio performance indicator of a respective device 106 that contradicts/differs from (for example, beyond a predetermined threshold) the curated group average of the respective group 110A, 110B of the device 106. Such a device 106 is referred herein to as an outlier device. For example, the curated group average itself may indicate a hardware/software error present among a majority particular group 110A, 110B while a particular radio device 106 of the corresponding group 110A, 110B is determined to be an outlier device because its respective curated radio performance indicator differs from the curated group average (for example, the particular error occurs less frequently or not at all on the device 106). Likewise, the radio performance indicator of an outlier device 106 contributed to the determination of the curated group average may also indicate an error or abnormality that negatively impacts operational performance of the particular radio device 106 with respect to at least the corresponding group 110A, 110B while the particular error is not common (over a predetermined period of time) to the corresponding group(s) 110A, 110B.

In some embodiments, the anomaly is further determined by the electronic processor 202 based on at least one selected from the group consisting of a type of the radio performance indicator, an associated measure of the radio performance indicator, a second curated group average of the radio performance indicator of the group, a curated group average of a second radio performance indicator of the group, a curated group average of a radio performance indicator of a second group, the curated radio performance indicator, a particular combination of the radio performance indicators of a respective radio device 106 of the plurality of radio devices 106. For example, the anomaly is determined based on a comparison of a curated radio performance indicator of a radio device 106 with another curated group average of a different group 110A, 110B in which the respective radio device 106 is not assigned to.

At blocks 416 and 418 respectively, the electronic processor 202 determines a recommended action to address the anomaly and transmits an electronic notification indicating the recommended action (for example, to a display of the device 106 corresponding to the anomaly or another of the devices 106 of the common group 110A, 110B). The electronic notification may be transmitted to a device 106 (for example, the outlier device). The recommended action may be a command that the outlier device 106 may perform automatically and/or that requires user intervention. The device 106 (for example, the outlier device) may generate a notification (for example, a visual or audio indication) instructing the user to perform and/or notifying the user of at least part of the recommended action. The recommended action, for example, is or includes at least one selected from the group consisting of upgrading a radio firmware, altering a component of the radio device 106, upgrading network performance, upgrading network coverage, and providing a user training instruction. The user training instruction is an instruction to the user to operate the device 106 in a particular way based on the anomaly. For example, in the case where the anomaly is determined to be that the user does not utilize a microphone of the device properly, the instruction may be a command to the user to speak closer to the microphone of the device.

In some instances, the electronic processor 202 is further configured to select a subset of the plurality of radio devices 106 that are operating from a common, shared location within the predefined geographical area and redetermine the curated group average based on a second plurality of curated radio performance indicators of the subset. The common location may be a sub-area of the predefined geographical area proximate to an outlier device (for example, within and/or just outside of a building). The electronic processor 202 may perform this redetermination, for example, to identify more particular factors contributing to the anomaly and/or to identify more outlier devices of the radio devices 106 (for example, within the subset).

Figure 5:
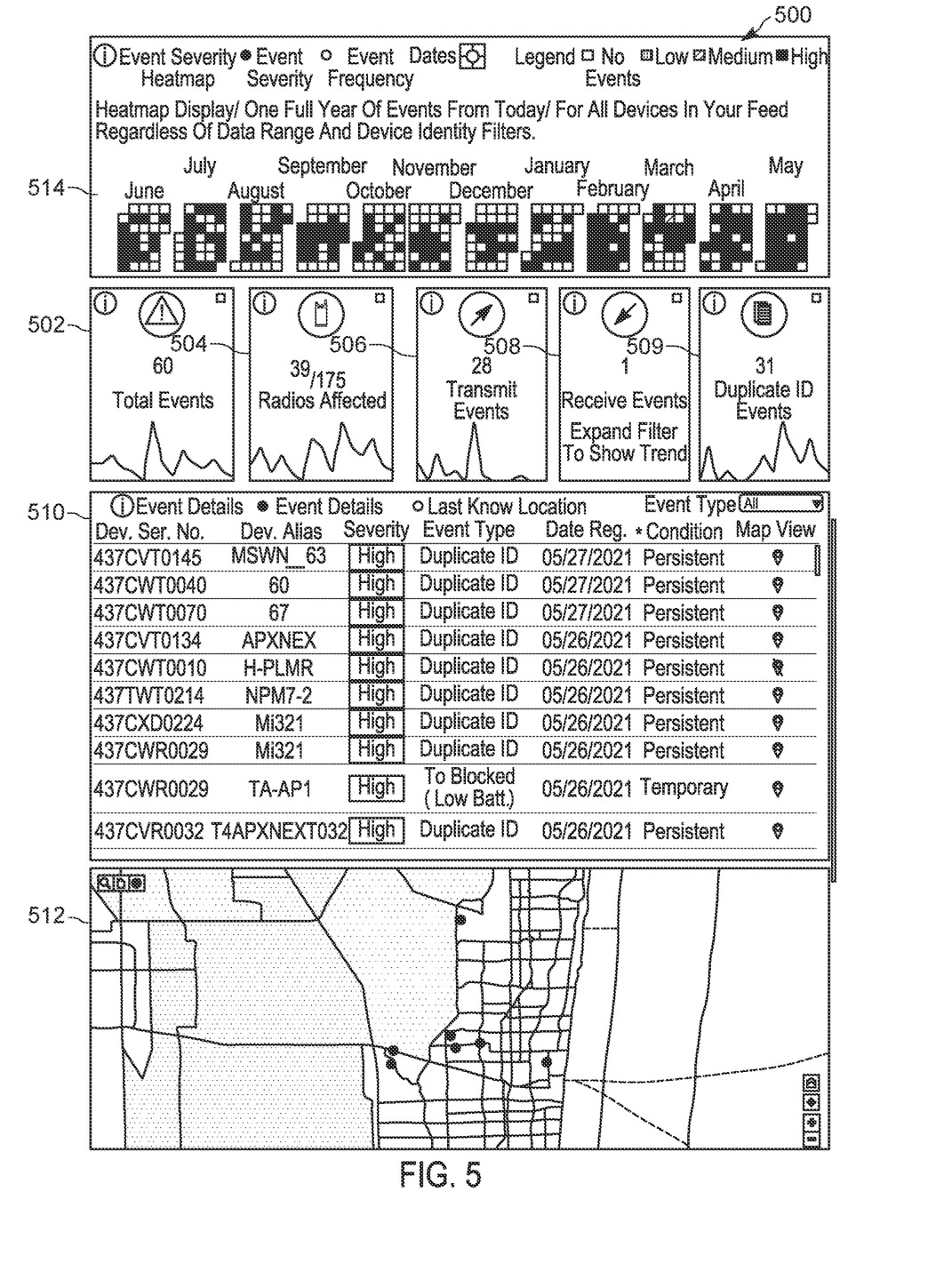
FIG. 5 is a graphical user interface 500 produced on a display based on the electronic notification generated by a server 102 of the system of FIG. 1, in accordance with some aspects.

FIG. 5 illustrates a graphical user interface 500 produced (for example, on a display of an outlier device) based on the electronic notification generated by the server 102. In the example provided, the interface 500 includes, among other things, an detected events window 502 that includes text and graphical information indicating a total number of detected anomaly events. The interface 500 also includes a radio devices affected window 504 that includes information regarding a total number of affected radio devices. The interface 500 also includes a transmit events window 506 that includes information regarding a number of transmit events. The interface also includes a receive events window 508 and a duplicate ID events window 509. The interface 500 includes an event details window 510 that lists events in a table format with columns related to device serial number, device alias, event severity, event type, date, configuration, and map view. The interface 500 also includes a map 512 of the predetermined geographic area of the particular group 110A, 110B indicating geographically where one or more events occurred. The interface 500 also includes a visual indication of the number of events. In one example, the interface includes an event severity heatmap window 514 have a number of heatmaps. In the example shown, the window 514 includes twelve heatmaps each corresponding to a calendar month. Each of the heatmaps visually indicates either or both of a severity and frequency of the events according to a respective location of each event. In some embodiments, as illustrated, each heatmap includes a plurality of partitions. Each partition corresponds to a respective sub-area of the predefined geographic area of the respective group 110A, 110B.

Figure 6:
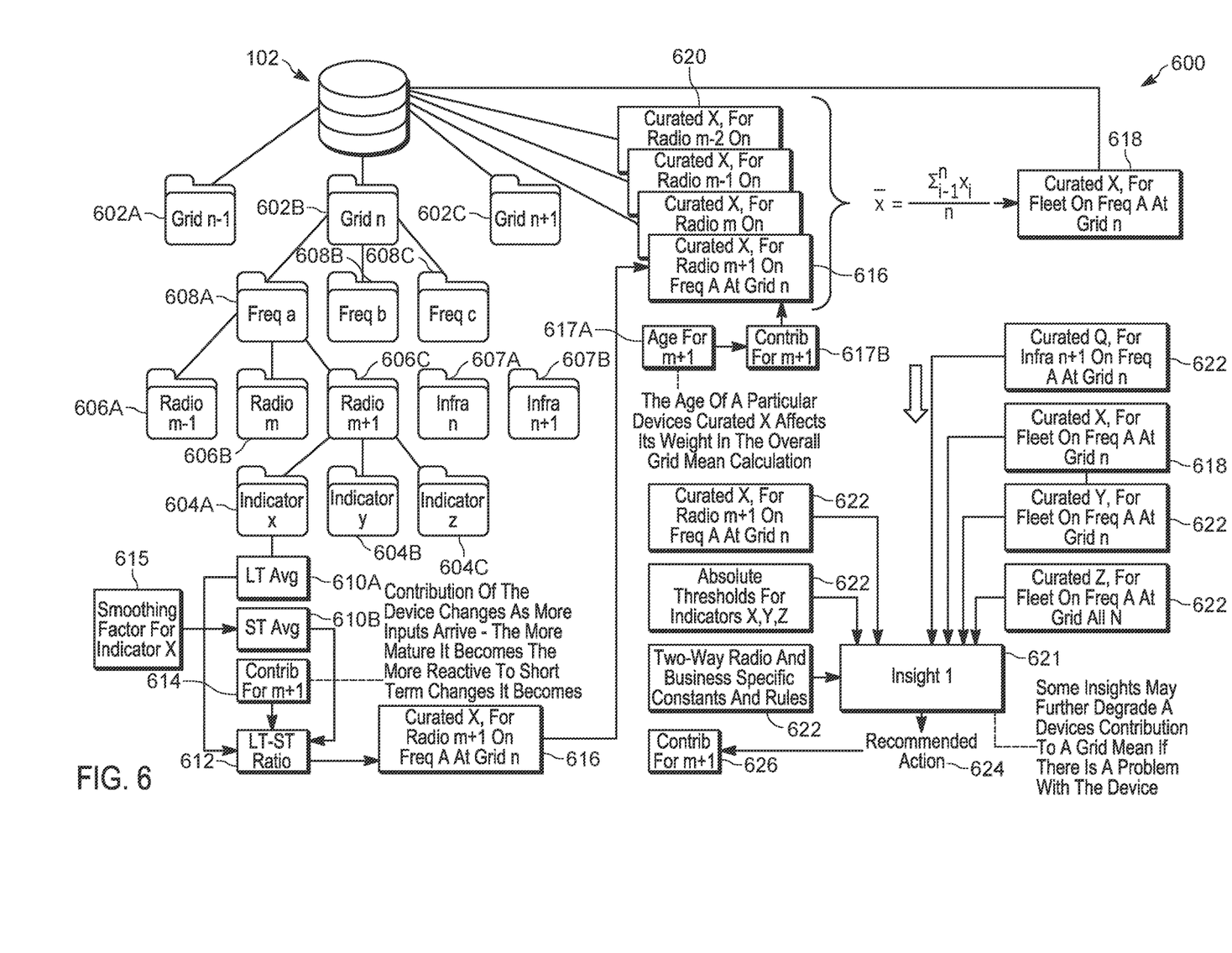
FIG. 6 is data flow and a flowchart illustrating a data organization and a method having some similarities to the method of FIG. 4 implemented by the server of FIG. 1 according to some aspects.

FIG. 6 is an example data flow and flowchart illustrating a method 600 similar to the method 400 of FIG. 4. In some instances, the method 600 is implemented by the server of FIG. 1. As illustrated, for each of a plurality of groups of a particular geographic region (referred to as grids) 602A-C, one or more types of a radio performance indicators 604A-C are obtained by the server 102 for each radio device 606A-C for a respective radio frequency 608A-C. For each indicator (for example, indicator 604A), a long-term average 610A and a short-term average 610B is determined. From the long-term average 610A and the short-term average 610B, a weighted ratio 612 is determined. In some embodiments, a weighting/smoothing factor 615 is applied to the short-term average 610B. The weighted ratio 612 may additionally be determined based on an amount of indicators 604A-C contributed by/obtained from the respective device 606A (block 614). In some embodiments, as described above, the age of the indicator 604A may also affect the determination of the weighted ratio 612. From the applied weighted ratio 612, a curated radio performance indicator 616 is produced. The electronic processor 202 then derives a curated group average 618 from the curated radio performance indicator 616 and a plurality of curated radio performance indicators 620 from the respective grid/group 602B of the device 606C. A weighting of a particular curated radio performance indicator 620 (including the curated performance indicator 616) is based on either or both of an age of the particular radio performance indicator 617A and an amount of indicators 617B contributed by/obtaining from the respective radio device 606C. From the curated group average 618, an insight 621 regarding one or more devices 606A-C of the group 602B may be determined (for example, an anomaly). The insight 621 is an understanding regarding an operational performance of one or more devices 606A-C (or one or more devices of another group 602A, 602C) based on, among other things, a comparison of an individual curated performance indicator (for example, the indicator 616) and the curated group average. In addition to the comparison, the insight 621 may also be based on other factors 622 including, but not limited to, a curated radio performance indicator of a same or a different type from a different infrastructure 607A, 607B/device 606A, 606B (for example, of the same grid/group 110A within the same communication network/frequency 608A), a curated group average of a same type or a different type of the group 602B, a curated radio performance indicator of a same or different type of a total average across a plurality of groups 602A-C, and one or more predetermined thresholds for one or more indicators. The insight 621 may also be generated based on one or more constants/rules (for example, historic known issues and/or factors) that may contribute to an effect on the operational performance of one or more of the radio devices 106. Based on the insight 621, the electronic processor 202 determines a recommended action 624, for example, to address a detected anomaly of one or more radio devices 106. In some embodiments, the amount of indicators contributed by the one or more respective devices 106 is accordingly increased (block 626).

As an example scenario, the electronic processor 202 determines, from raw data obtained over a radio frequency (Frequency A) from a first radio device 106 assigned to a group 110A, 110B within/assigned to a particular geographic area (for example, a Grid N). From the raw data, the electronic processor 202 determines that the first radio device 106 has a high BER and low RSSI. The processor 202 flags the first device 106 for a receiver anomaly within Grid N over Frequency A. The anomaly may be related to wireless network coverage or faulty equipment. Based on at least a comparison of a curated radio performance indicator of the first radio device 106 and a respective curated group average related to a BER and RSSI of the respective group (for the example described for this particular scenario, group 110A) of Grid N of the first radio device 106, the electronic processor 202 determines that the first radio device 106 is an outlier device. Based on one or more other radio performance indicators from the first radio device 106, the electronic processor 202 determines an antenna impedance mismatch of the first radio device 106 is beyond a predetermined threshold. Because the curated group average for the group 110A does not reflect a high RSSI and a high BER in Grid N, the electronic processor 202 determines that the detected anomaly stems from a factor experienced by the first radio device 106 that is unique to the first radio device 106 or unique to a particular subset of the group 110A including the first radio device 106. For example, the electronic processor 202 may determine that the devices 106 of Grid N normally have relatively low transmission retries based on one or more curated group averages. The electronic processor 202 may also determine that overall LMR usage in Grid N is relatively low and that the predetermined geographic area of Grid N has at least suitable network coverage. The electronic processor 202 may also determine whether the data volume in Grid N is enough (for example, exceeds a predetermined threshold) to determine an insight/anomaly accurately. The processor 202 may determine based on radio performance indicators from one or more infrastructures that Grid N is in a normal status regarding, for example, network coverage meets a predetermined level. The electronic processor 202 may also determine that, because transmissions coming into the infrastructure that serves Grid N have had low BER, that the inbound path is of normal quality. The electronic processor 202, based on one or more radio performance indicators, may determine that the volume of the device 106 is at a normal setting and that, in the last hour's receptions for example, the microphone of the first device 106 has detected receive activity that is audible/above a predetermined threshold. The insight/anomaly that the electronic processor 202 determines, based on the results of the comparison as well as the other indicators described above, may indicate that an antenna of the first radio device 106 is broken, misconnected, or is incompatible with the first radio device 106. The corresponding recommended action, determined by the processor 202 and generated in an electronic notification, may be, for example, an instruction to replace the antenna.

Although the example just explained relates to an anomaly caused by a faulty antenna, anomalies detected by the electronic processor 202, via the method 400 and/or the method 600 may relate to a variety of situations. An anomaly may relate to a radio frequency performance of a first radio device 106 differing from one or more other radio devices 106 of the respective group 110A, 110B. A difference in the radio frequency performance of one device and another device may be caused by a number of different issues. The processor 202 may determine, for example, that a particular location (for example, near or within a building within the predefined geographic area), a network problem, and/or a user handling problem is related to or causes the anomaly.

For example, a particular tuning of radio device 106 may affect the performance. As discussed, a condition and/or compatibility of an antenna of the device 106 may affect the performance. A battery condition may affect the performance of the radio device 106. A transmitter condition/quality may affect the performance. A microphone quality and/or compatibility may also affect the performance of the radio device 106. A SNR and/or an automatic frequency control (ATC) operation may also affect the performance. Environmental issues (for example, weather) associated with a particular location within the geographic area/grid of the first radio device 106 may affect the performance. Radio frequency errors and/or deviations may also impact performance.

In one aspect, the electronic processor 202, in the determination of an anomaly within a group of the plurality of devices 106, also determines, from the raw data, one or more radio performance indicators, and/or curated group average(s) as described above, that the anomaly is related to one or more issues with the geographical location of the first radio device 106. This may be determined, for example, by the electronic processor 202 based on the collected data/indicators and/or comparison to of a curated radio performance indicator to a respective curated group average of devices 106 within the predefined geographic area. For example, the electronic processor may determine that, for a particular location (the predefined geographic location or a sub-area thereof) do not meet one or more performance thresholds over a predetermined time, an average number or retries, a new interferer (for example, a sudden change in the curated group average over time), and/or a change in network coverage.

The processor 202 may determine a network problem via the method 400 and/or the method 600. The processor 202, for example, may identify one or more locations where the device 106 would be out of range of network coverage. The processor 202, for example, may identify one or more locations where network coverage is available for the device 106 (or that network cover of a predetermined quality is available). The processor 202 may also determine, from the raw data, one or more radio performance indicators relating to network (site) issues.

In some instances, the processor 202 detects anomalies and trends of individual devices and within a group of devices based on the weighted comparison of the curated group average with the curated radio performance indicator of the individual radio device 106 combined with the other collected/derived information as described above. In some instances, the processor 202, from the raw radio data, is able to not only identify anomalies based on hardware and/or software issues alone, but, through the comparison with the curated group average in combination with additional data as described above, is able to characterize and aide in identifying the particular user handling and/or particular environments which result in outlier cases.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method of identifying anomalies within radio devices, the method comprising:
   at a data analytics platform and via an electronic processor of the data analytics platform,
   obtaining raw radio data from a radio device of a plurality of radio devices assigned to a group within a predefined geographic area;
   identifying, from the raw radio data, a radio performance indicator related to an operational performance of the radio device, the radio performance indicator being associated with a radio communication frequency of the group;

determining a long-term average and a short-term average of the radio performance indicator based on previously received radio performance indicators from the radio device;

determining a weighted ratio of the long-term average and the short-term average based on an age of the radio performance indicator and an amount of the previously received radio performance indicators from the radio device;

generating a curated radio performance indicator from the weighted ratio and the radio performance indicator;

deriving, from a plurality of curated radio performance indicators from the plurality of radio devices and the curated radio performance indicator, a curated group average of the radio performance indicator of the group;

determining an anomaly in the operational performance of the radio device based on a comparison of the curated radio performance indicator and the curated group average of the radio performance indicator;

determining a recommended action to address the anomaly; and transmitting an electronic notification indicating the recommended action.

2. The method of claim 1, wherein deriving the curated group average comprises:

assigning a first weight to a first curated radio performance indicator of a first radio device of the plurality of radio devices contributed by the first radio device based on an age of the first curated radio performance indicator;

assigning a second weight less than the first weight to a second curated radio performance indicator of a second radio device of the plurality of radio devices contributed by the second radio device based on an age of the second curated radio performance indicator, the age of the second curated radio performance indicator being greater than the age of the first curated radio performance indicator.

3. The method of claim 1, wherein deriving the curated group average comprises:

assigning a first weight to a first curated radio performance indicator of the plurality of curated radio performance indicators of a first radio device of the plurality of radio devices based on a first amount of curated radio performance indicators of the first radio device;

assigning a second weight greater than the first weight to a second curated radio performance indicator of the plurality of curated radio performance indicators of a second radio device of the plurality of radio devices based on a second amount of curated radio performance indicators of the second radio device.

4. The method of claim 1, wherein a weight of the short-term average of the weighted ratio is greater than a weight of the long-term average when an amount of previously received radio performance indicators is above a predetermined threshold.

5. The method of claim 1, wherein the weighted ratio is determined based on a type of radio performance indicator.

6. The method of claim 1, wherein the method further comprises selecting a subset of the plurality of radio devices that are operating from a common location within the predefined geographic area and redetermining the curated group average based on a second plurality of curated radio performance indicators of the subset.

7. The method of claim 1 wherein the anomaly is further determined based on at least one selected from the group consisting of a type of the radio performance indicator, an associated measure of the radio performance indicator, a second curated group average of the radio performance indicator of the group, a curated group average of a second radio performance indicator of the group, a curated group average of a radio performance indicator of a second group, the curated radio performance indicator, a particular combination of the radio performance indicators of a respective radio device of the plurality of radio devices.

8. The method of claim 1, wherein the recommended action includes at least one selected from the group consisting of upgrading a radio firmware, altering a component of the radio device, upgrading network performance, upgrading network coverage, and providing a user training instruction.

9. The method of claim 1, wherein the radio performance indicator represents at least one selected from the group consisting of a bit error rate, a signal strength, call information, a call type, a location, a battery level, a battery characteristic, a mode of operation, a call error, a site status, a signal-to-noise ratio, an antenna characteristic, a temperature, an authentication failure, and a physical handling of the radio device.

10. The method of claim 1, wherein the weighted ratio is determined based on a previously determined anomaly associated with the radio device.

11. A data analytics platform system of identifying anomalies within radio devices, the system comprising:

a transceiver; and an electronic processor configured to obtain, via the transceiver, raw radio data from a radio device of a plurality of radio devices assigned to a group within a predefined geographic area, identify, from the raw radio data, a radio performance indicator related to an operational performance of the radio device, the radio performance indicator being associated with a radio communication frequency of the group, determine a long-term average and a short-term average of the radio performance indicator based on previously received radio performance indicators from the radio device, determine a weighted ratio of the long-term average and the short-term average based on an age of the radio performance indicator and an amount of the previously received radio performance indicators from the radio device, generate a curated radio performance indicator from the weighted ratio and the radio performance indicator, derive, from a plurality of curated radio performance indicators from the plurality of radio devices and the curated radio performance indicator, a curated group average of the radio performance indicator of the group, determine an anomaly in the operational performance of the radio device based on a comparison of the curated radio performance indicator and the curated group average of the radio performance indicator, determine a recommended action to address the anomaly, and transmit an electronic notification indicating the recommended action.

12. The system of claim 11, wherein deriving the curated group average comprises
assigning a first weight to a first curated radio performance indicator of a first radio device of the plurality of radio devices contributed by the first radio device based on an age of the first curated radio performance indicator and
assigning a second weight less than the first weight to a second curated radio performance indicator of a second radio device of the plurality of radio devices contributed by the second radio device based on an age of the second curated radio performance indicator, the age of the second curated radio performance indicator being greater than the age of the first curated radio performance indicator.

13. The system of claim 11, wherein deriving the curated group average comprises:
assigning a first weight to a first curated radio performance indicator of the plurality of curated radio performance indicators of a first radio device of the plurality of radio devices based on a first amount of curated radio performance indicators of the first radio device;
assigning a second weight greater than the first weight to a second curated radio performance indicator of the plurality of curated radio performance indicators of a second radio device of the plurality of radio devices based on a second amount of curated radio performance indicators of the second radio device.

14. The system of claim 11, wherein a weight of the short-term average of the weighted ratio is greater than a weight of the long-term average when an amount of previously received radio performance indicators is above a predetermined threshold.

15. The system of claim 11, wherein the weighted ratio is determined based on a type of radio performance indicator.

16. The system of claim 11, wherein the electronic processor is further configured to select a subset of the plurality of radio devices that are operating from a common location within the predefined geographic area and redetermine the curated group average based on a second plurality of curated radio performance indicators of the subset.

17. The system of claim 11 wherein the anomaly is further determined based on at least one selected from the group consisting of a type of the radio performance indicator, an associated measure of the radio performance indicator, a second curated group average of the radio performance indicator of the group, a curated group average of a second radio performance indicator of the group, a curated group average of a radio performance indicator of a second group, the curated radio performance indicator, a particular combination of the radio performance indicators of a respective radio device of the plurality of radio devices.

18. The system of claim 11, wherein the recommended action includes at least one selected from the group consisting of upgrading a radio firmware, altering a component of the radio device, upgrading network performance, upgrading network coverage, and providing a user training instruction.

19. The system of claim 11, wherein the radio performance indicator represents at least one selected from the group consisting of a bit error rate, a signal strength, call information, a call type, a location, a battery level, a battery characteristic, a mode of operation, a call error, a site status, a signal-to-noise ratio, an antenna characteristic, a temperature, an authentication failure, and a physical handling of the radio device.

20. The system of claim 11, wherein the weighted ratio is determined based on a previously determined anomaly associated with the radio device.

* * * * *